United States Patent
Matsuda

(10) Patent No.: US 6,171,209 B1
(45) Date of Patent: Jan. 9, 2001

(54) BACK DRIVE TYPE SILENT CHAIN

(75) Inventor: Akio Matsuda, Nabari (JP)

(73) Assignee: Borg-Warner Automotive K.K. (JP)

( * ) Notice: Under 35 U.S.C. 154(b), the term of this patent shall be extended for 0 days.

(21) Appl. No.: 09/234,975

(22) Filed: Jan. 21, 1999

(30) Foreign Application Priority Data

Feb. 23, 1998 (JP) .................................................. 10-058786

(51) Int. Cl.⁷ .................................................. F16G 13/04
(52) U.S. Cl. .......................................... 474/213; 474/212
(58) Field of Search ..................................... 474/212, 213, 474/214, 148, 202, 206, 216, 215–217, 228–233

(56) References Cited

U.S. PATENT DOCUMENTS

| 1,140,319 | 5/1915 | Van Houten . |
| 1,956,942 | 5/1934 | Belcher et al. ........................ 74/245 |
| 2,266,688 | * 12/1941 | Keller ................... 474/214 |
| 3,358,524 | 12/1967 | Patrignani ........................ 474/231 X |
| 5,176,586 | 1/1993 | Sugimoto .............................. 474/212 |
| 5,334,111 | * 8/1994 | Cole, Jr. et al. ...................... 474/214 |
| 5,345,753 | 9/1994 | Okuda et al. ............................... 59/5 |
| 5,419,743 | 5/1995 | Takeda et al. ........................ 474/157 |
| 5,967,926 | 10/1999 | Kozakura et al. .................... 474/213 |
| 5,989,140 | 11/1999 | Ichikawa et al. ................ 474/213 X |

FOREIGN PATENT DOCUMENTS

| 443581 | 9/1912 | (FR) . |
| 15941 | 10/1916 | (GB) . |
| 230839 | 8/1925 | (GB) . |
| 2326213A | 12/1998 | (GB) . |
| 4-52641 | 5/1992 | (JP) . |
| 4-210144 | 6/1992 | (JP) . |

* cited by examiner

Primary Examiner—David A. Bucci
Assistant Examiner—Marcus Charles
(74) Attorney, Agent, or Firm—Sidney & Austin; Greg Dziegielewski

(57) ABSTRACT

A guide link for a back-drive silent chain includes a pair of flat outside surfaces and window holes. The flat outside surfaces are formed on the opposite sides of the center line of the apertures for contacting a chain guide or tensioner arm. The edge portions of the window holes in the vicinity of the apertures are formed of arcuate surfaces equally spaced apart from the edge portions of the apertures.

10 Claims, 4 Drawing Sheets

BACK DRIVE TYPE SILENT CHAIN

BACKGROUND OF THE INVENTION

This invention relates to a back-driving silent chain, and in particular, it relates to a guide link for a back-driving silent chain that has window portions to reduce the stiffness or rigidity of the link. The chain has a plurality of rows of links that are interleaved and connected by a connecting pin inserted in the apertures of each of the link plates. In its preferred embodiment each row comprises multiple link plates, each with a pair of apertures and a pair of teeth on both sides of the aperture or pinhole center line. The link plates have guide links positioned on the outermost side of the link plates. The invention relates to an improvement in the construction of the guide links.

Silent chains are used conventionally as power transmission chains for automobiles and motorcycles in transmissions and transfer cases for four-wheel drive vehicles. In general, a silent chain is comprised of multiple link plates, each of which has a pair of teeth. Each link typically includes a pair of apertures. The links are interleaved and are connected by connecting pins placed in the apertures. Guide links are positioned on the outermost side of the link plates and the ends of the connecting pins are press fit into apertures in the guide links.

FIGS. 7 and 8 show examples of a conventional low-rigidity or low stiffness guide links. FIG. 7 shows the guide link disclosed in Japanese Utility Model No. 4-52641 ('641) (U.S. Pat. No. 5,176,586). In this case, guide link 100 has pinholes 101, 102 and window hole 103. As is clear from the shape of pinholes 101, 102 and lines 1–2 of the '641 specification, the silent chain with guide link 100 is the rocker joint-type silent chain that uses a rocker joint composed of a pair of long and short connecting pins and pinholes 101, 102 that secure the press-fit end of the longer pin of the rocker joint. Incidentally, single-dot line 110 in the figure indicates the pinhole center line.

When the silent chain comprising multiple link plates and guide links such as guide link 100 is operated, tension acts along the entire length of the chain. Tensile force applied through the connecting pins, in the direction to expand the aperture center distance (or pitch), acts on the apertures 101, 102 of the guide links and on the apertures of the link plates. Because the rigidities or stiffness of the inner links differs from the stiffness of the guide links, the connecting pins of a conventional silent chain can be deformed or possibly fractured.

Therefore, various ideas have been implemented in the past to equalize the elongation of the guide links and inner links caused by the tensile load (tensile rigidity). The tensile load is applied during chain operation or, more commonly, during a preloading or pre-stressing operation after assembly of the chain.

FIG. 8 shows the guide link disclosed in Japanese Laid-Open Patent Heisei 4-210144 ('144) (U.S. Pat. No. 5,345,753) and guide link 200 has pinholes 201, 202 and slit 203. As is clear from the shape of pinholes 201, 202, the silent chain with this guide link 100, too, is a rocker-joint-type silent chain and the end of the longer pin of the rocker joint is press-fit in apertures 201,202. Incidentally, single-dot line 210 in the figure indicates the pinhole center line.

For these guide links, the tensile rigidity of the guide link is lowered by formation of a window hole 103, 203 or slit. That is, the guide link is made to deform or elongate equally with the link plate against the tensile load, to prevent deformation of the rocker joint.

However, the conventional guide links are guide links for the rocker joint, as shown in FIGS. 7 and 8. Material thickness d at the edge of pinholes 101, 102 and window hole 103 differs from material thickness d' at the pinholes 201, 202 and slit 203. Depending on the position of the pinhole, the press-fit between the end of the pin of the rocker joint and pinhole may not be secure.

In the example in FIG. 8, although the material thickness d' at the edges of slit 203, pinholes 201, 202 looks sufficient in the figure, the material thickness can be considerably less locally at the edges of the pinhole and slit as shown in FIG. 7. If the round pinhole of the guide link 200 is changed to receive a round pin, while a similar slit, 203, is utilized, decrease of the force that secures the end of the rocker joint pin in the pinhole can occur easily.

On the other hand, in the case of the back-driving silent chain, which includes links with pairs of teeth on both sides of the centerline between the apertures, the thickness of the guide link must be sufficient to ensure the contact area between the chain and the shoe of an associated chain tensioner arm. Thus, the rigidity of the guide link is higher than that of the normal guide link. Therefore, a low-rigidity guide is strongly needed, especially for the back-driving silent chain.

This invention addresses the above-described situations and its purpose is to offer a back-driving silent chain of low rigidity that does not result in the decrease of the fitting force between the pinhole of the guide link and the connecting pin.

SUMMARY OF THE INVENTION

In its preferred embodiments, the silent chain or power transmission device of the present invention comprises a silent chain having multiple rows of links. Each of the link rows is comprised of multiple link plates each having a pair of circular apertures formed at both ends thereof and a pair of teeth on each of the opposite sides of the center line extending between the center of the apertures. The link plates are connected with one another by round pins received in the pair of apertures.

Guide links are placed on the outer edges of the rows of links of the chain in the transverse direction and the ends of the round pins are press-fit into the apertures of the guide links. Each of the guide links include a pair of flat outside surfaces at the upper and lower edges of the guide links in the vertical direction. The flat outside surfaces are formed on the opposite sides of the center line between the apertures. A chain guide or tensioner arm shoe contacts the flat outside surfaces. The guide links also include window holes with the edge portions of the window holes in the vicinity of the apertures being formed of arcuate surfaces equally spaced apart from the edge portions of the apertures.

In another embodiment, the back-driving silent chain of this invention comprises multiple link plates having a pair of circular apertures at both ends thereof and a pair of teeth on the opposite sides of the center line of the apertures. The link plates are connected with one another by round pins received in the apertures. Guide links are press-fit on the outer edges of the rows of plates. The ends of the round pins are press-fit into the apertures of the guide links. Each of the guide links include a pair of flat outside surfaces and a pair of slits formed on the opposite sides of the center line of the apertures. A chain guide or tensioner arm shoe contacts the flat outside surfaces of the guide links. The edge portions of the slits are in the vicinity of the apertures and are formed of arcuate surfaces equally spaced apart from the edge portions of the apertures.

In the silent chain of this invention, the end of the round connecting pin is press-fit into a corresponding round pinhole of the guide link. Window holes or slits are formed on both sides of the center line of the pinholes of the guide link. The edge in the vicinity of such a window hole or slit is formed by arcuate surfaces which arc at equal distances from the edge of the pinhole.

The contact area between the guide link and chain guide or shoe of the chain tensioner is along the outside edges of the guide link. At the same time, the rigidity of the guide link is reduced and the material thickness at the edges of the window hole or pinhole in the vicinity of the slit can be made uniform. As a result, the fitting force between the pinhole and connecting pin, or the force of the link that holds the pin press-fit in the aperture, is not reduced.

BRIEF DESCRIPTION OF THE DRAWINGS

A preferred embodiment of this invention is explained with reference to the attached drawings. In the drawings.

DETAILED DESCRIPTION OF THE PREFERRED EMBODIMENTS

Figure 1:
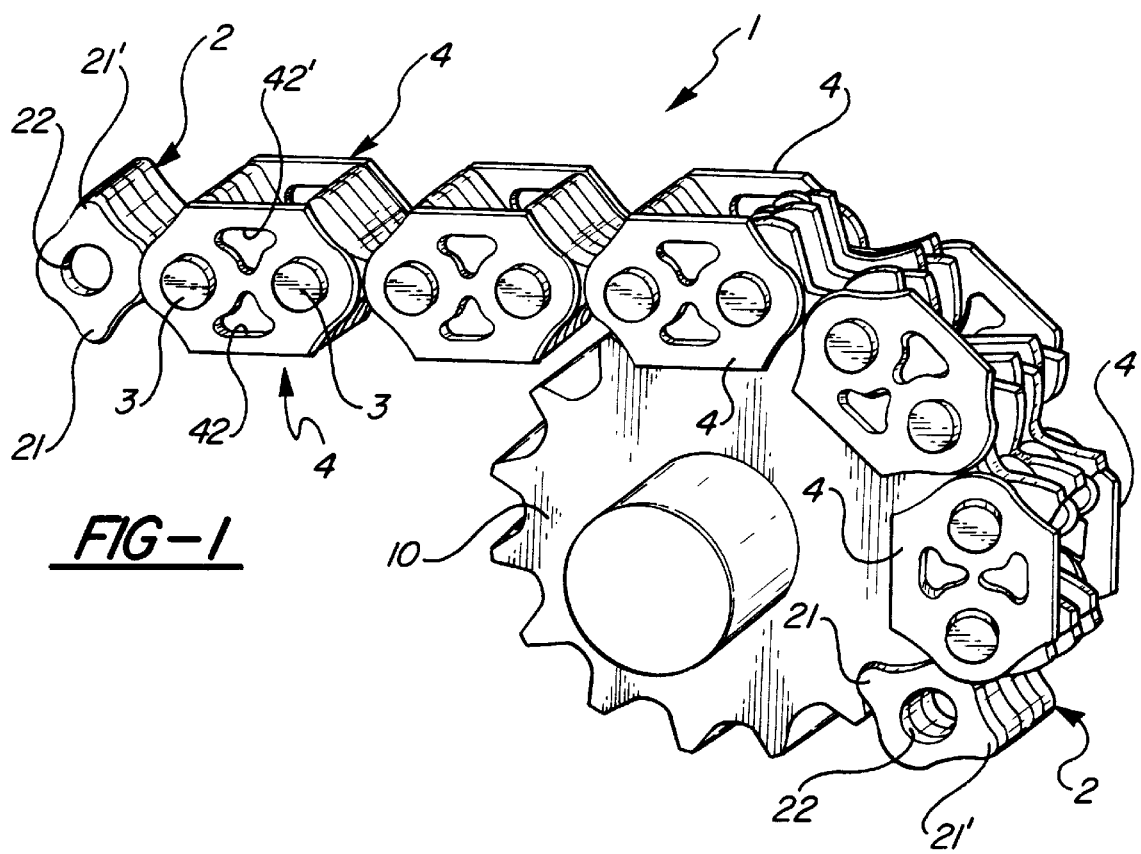
FIG. 1 is a perspective view of a portion of the back-driving silent chain of one embodiment of this invention.

As shown in FIG. 1, multiple link plates 2, each of which has a pair of teeth 21, 21' and a pair of pinholes 22, are placed in rows and interleaved to form silent chain 1. Link plates 2 are pivotally connected by inserting round connecting pin 3 in pinhole 22 of the link plate. Guide link 4 is positioned on the outermost side of the row formed by multiple link plate 2.

Figure 2:
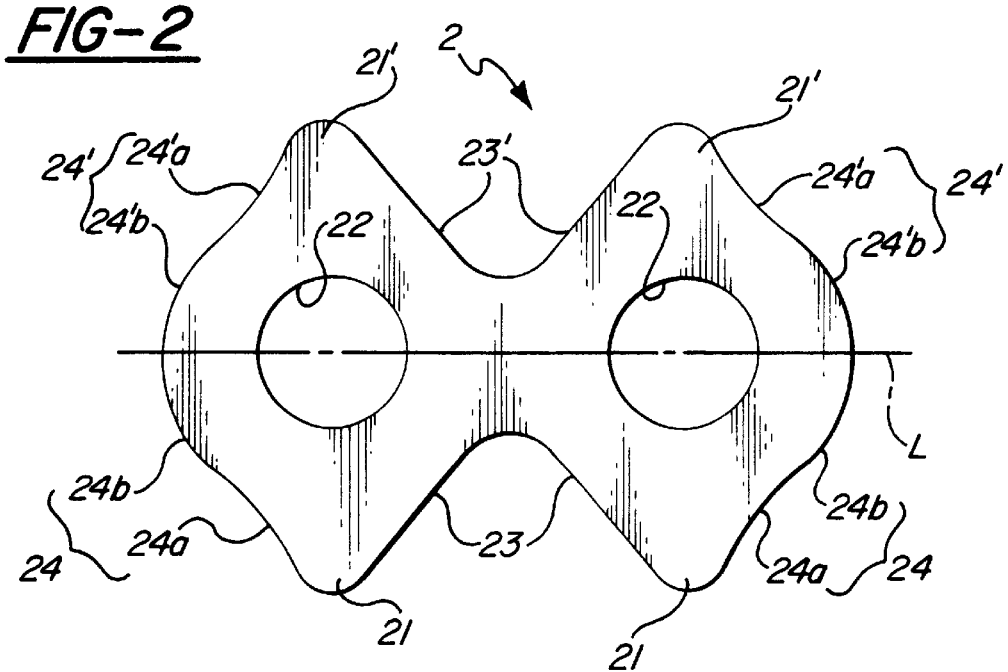
FIG. 2 is an enlarged front view of the link plate of the silent chain of FIG. 1.

As shown in FIG. 2, a pair of teeth 21, 21' is formed on each of both sides of pinhole center line L of round pinholes 22. Link plate 2 is symmetric about pinhole center line L. Thereby, silent chain 1 engages with sprocket 10 on the side of teeth 21 (FIG. 1) and the sprocket (not shown) on the side of teeth 21'. A pair of teeth 21, 21' are formed on both sides of pinhole center line L of link plate 2. A back-driving silent chain, which drives with teeth on both sides of each link, is composed in this manner.

Tooth 21 is composed of inside flank 23 and outside flank 24. Inside flank 23 is composed of a nearly straight flat surface or a slightly curved surface and outside flank 24 is composed of a nearly straight flat surface 24a formed near the tip of tooth 21 and convex surface 24b formed in the vicinity of pinhole 22.

Similarly, each tooth 21' is composed of inside flank 23' and outside flank 24'. Inside flank 23' is composed of a nearly straight flat surface or a slightly curved surface and outside flank 24' is composed of a nearly straight flat surface 24'a which is formed near the tip of tooth 21' and a convex surface 24'b formed in the vicinity of pinhole 22. The shapes of inside flank 23, 23' and outside flank 24, 24' are not limited to those shown in FIG. 2.

Figure 3:
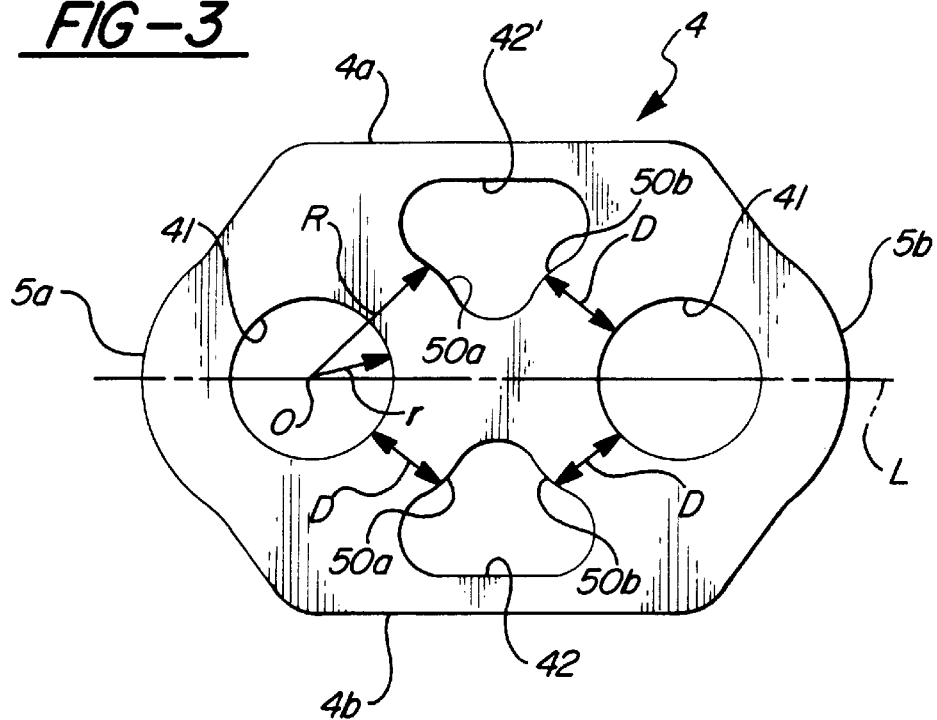
FIG. 3 is an enlarged front view of the guide link of the silent chain of FIG. 1.

As shown in FIG. 3, the guide link has a pair of round pinholes 41 of radius r and the end of connecting pin 3 is press-fit in these pinholes 41. A pair of flat outside surfaces 4a, 4b are formed in guide link 4 on both sides of pinhole center line L. Preferably, guide link 4 is symmetric to pinhole center line L. These outside surfaces 4a, 4b are for contacting an associated chain guide or shoe of a chain tensioner (not shown).

A pair of window holes 42, 42' are also formed in guide link 4. These window holes 42, 42' are preferably symmetrical about pinhole center line L and substantially triangular in shape. The window holes 42, 42' each have a pair of arcuate sides 50a, 50b which in the vicinity of the pinhole is formed by an arcuate surface of radius R around pinhole center O. The equal spacing of the pair of arcuate sides 50a, 50b from a corresponding aperture edge creates a uniform material thickness D, which equals (R−r), between each edge of window holes 42, 42' in the vicinity of the pinhole and edge of pinhole 41.

The size of this material thickness is set such that the diameter of the aperture of pinhole 41 of guide link 4 does not expand or increase when the tensile load in the direction of chain pitch acts on the silent chain. Accordingly, the material thickness between the edges of window holes 42, 42' and the edge of pinhole 41 can be made uniform in the vicinity of the pinhole. As a result, decrease of the fitting force between pinhole 41 and connecting pin 3 is not reduced or decreased.

Window 42 of guide link 4 is primarily for the purpose of the reduction of the rigidity of guide link 4 during engagement of teeth 21 of link plate 2 with the sprocket teeth. Window 42' is primarily for reduction of the rigidity of guide link 4 during engagement of teeth 21' of link plate 2 with the sprocket teeth. However, window 42' and window 42, respectively and supplementarily contribute to the reduction of rigidity of the guide link 4 when teeth 21 and 21' engage with the sprocket teeth. The window reduces the stiffness of the guide link and thus permits greater elongation of the guide link when the chain is under tension, such as in operation or during a pre-stress operation. Thereby, the rigidity of guide link 4 is reduced.

The center of the arc (i.e., center point of the radius that forms the arc) that forms each edge of windows 42, 42' in the vicinity of the pinhole need not necessarily coincide with pinhole center O. As long as the material thickness between the edges of window holes 42, 42' and the edge of pinhole 41 are substantially uniform, the center of the arc that forms each edge can be on the edge of pinhole 41 or outside of pinhole 41. Also, each edge of window holes 42, 42' can be composed of multiple arcs.

Figure 4:
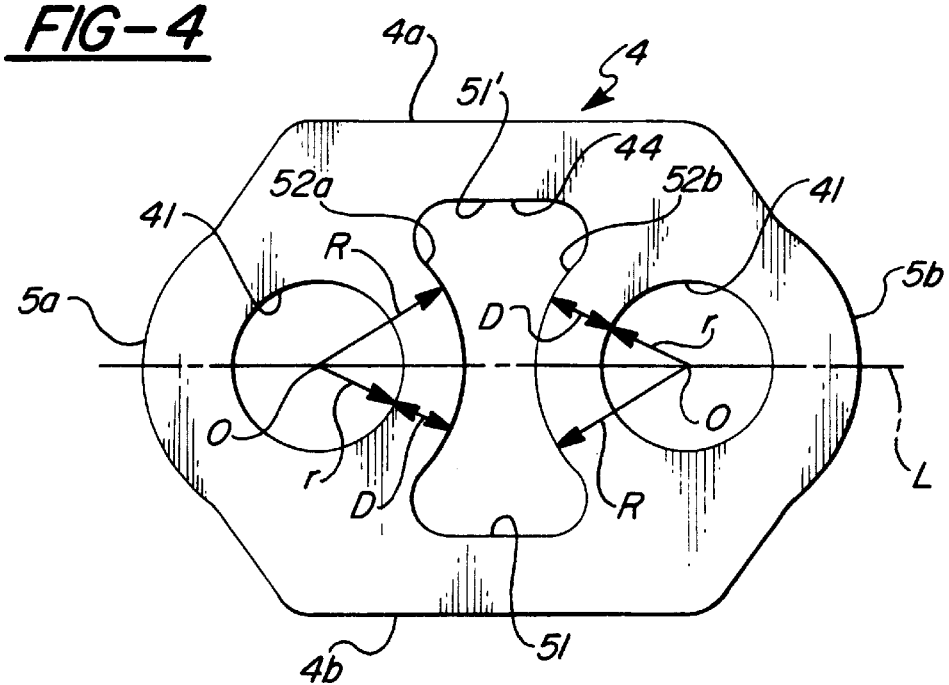
FIG. 4 is a second embodiment of the guide link of the present invention.

The window hole formed in guide link 4 is not limited to that of the above example. An alternate embodiment is shown in FIG. 4. Incidentally, the same number references in FIG. 4 indicate the same parts as in FIG. 3. In this case, one window hole 44, which is symmetrical about pinhole center line L, is formed. The window hole is generally I-shaped having a top side or edge 51' and a bottom side or edge 51 and a left side 52a and a right side 52b. Each left and right side or edge 52a, 52b of window hole 44 in the vicinity of the pinhole is formed by the arcuate surface with radius R which is concentric with pinhole center O. The equal spacing of the pair of arcuate sides 52a, 52b from a corresponding aperture edge creates a uniform material thickness D, which equals (R−r), between each edge of window hole 44 in the vicinity of the pinhole and edge of pinhole 41.

Thereby, similar to the FIG. 3 embodiment, the rigidity of guide link 4 can be reduced and the material thickness between the edge of window hole 44 and the edge of pinhole 41 can be made uniform in the vicinity of the pinhole, which avoids a reduction in the fitting force between pinhole 41 and connecting pin 3. In addition to window hole in guide link 4 shown in FIGS. 3 and 4, the invention can include a slit, as shown in the FIGS. 5 and 6, and described below.

Figure 5:
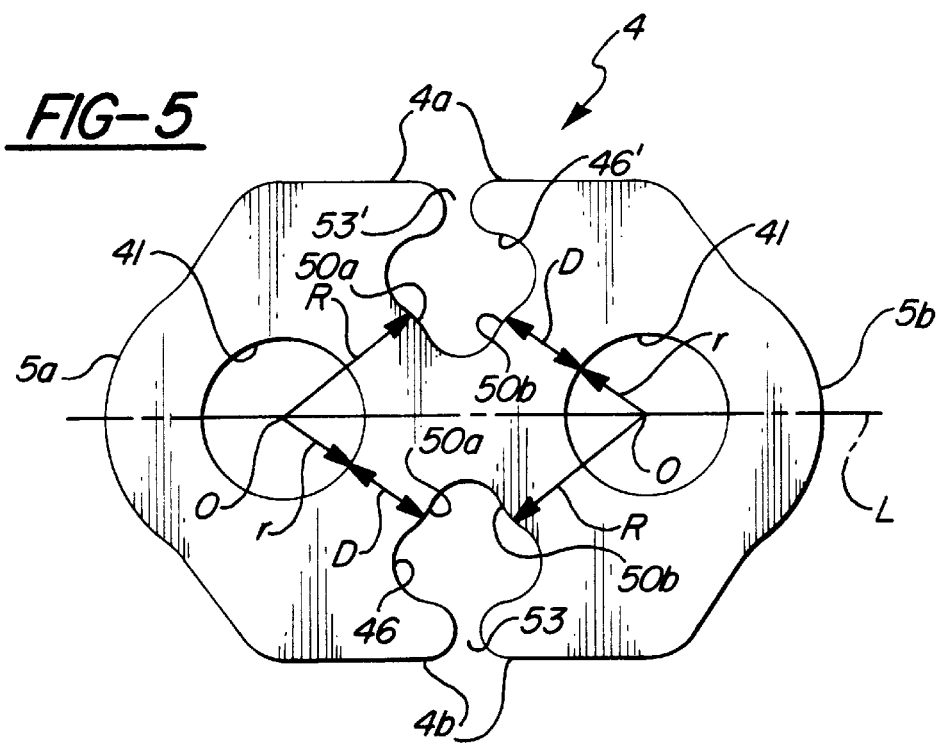
FIG. 5 is a third embodiment of the guide link of the present invention.

FIG. 5 shows another embodiment of this invention and, in the figure, the same reference characters as in the above embodiments indicate the same or corresponding parts. In this example, a pair of slits 46, 46' extend from the center of outside surfaces 4a, 4b of guide link 4 to the side of link center line L. Slits 46, 46' are preferably symmetrical to pinhole center line L. Each of slits 46, 46' is substantially triangular in shape with a pair of arcuate sides 50a, 50b in the vicinity of the pinhole. Arcuate sides 50a, 50b are formed by an arcuate surface with radius R which is concentric with pinhole center O. Openings 53, 53' in slits 46, 46' open to outside surface 4a, 4b. Uniform material thickness D, which equals (R−r), is ensured between the arcuate sides 50, 50b and the edge of pinhole 41. Thereby, the rigidity of guide link 4 can be reduced and the material thickness between each edge of slits 46, 46' and the edge of pinhole 41 in the vicinity of the pinhole can be made uniform, which avoids a decrease of the fitting force between pinhole 41 and connecting pin 3.

Figure 6:
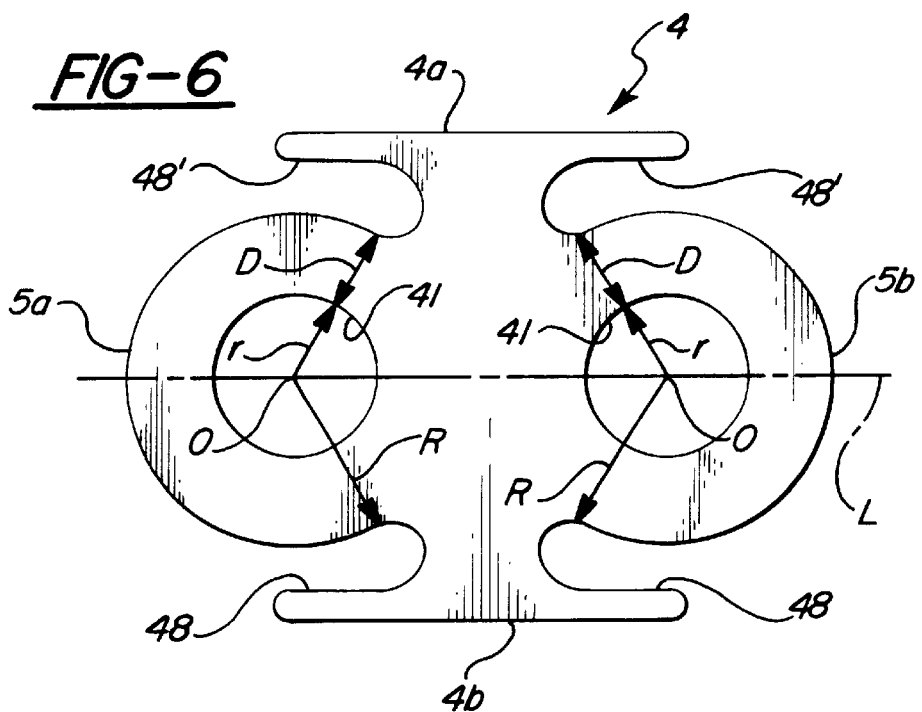
FIG. 6 is a fourth embodiment of the guide link of the present invention.
Figure 7:
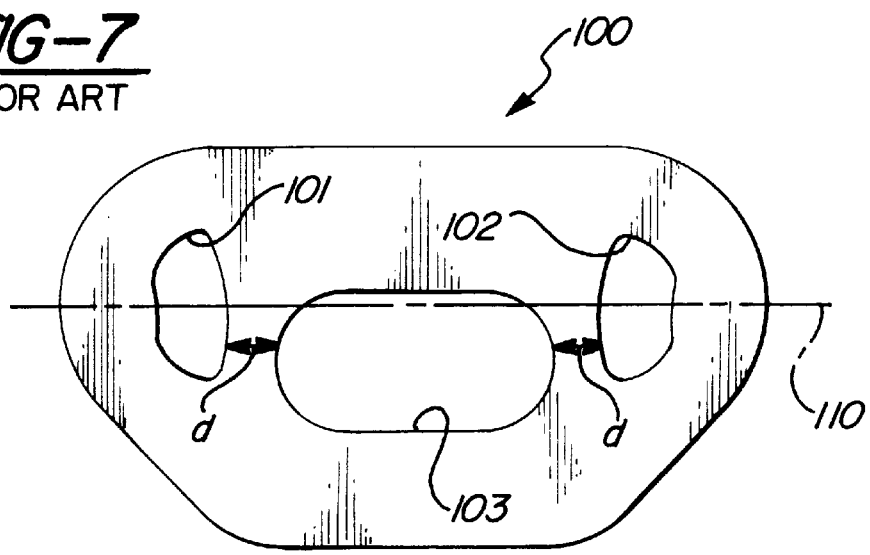
FIG. 7 is an enlarged front view of a conventional guide link of the prior art.
Figure 8:
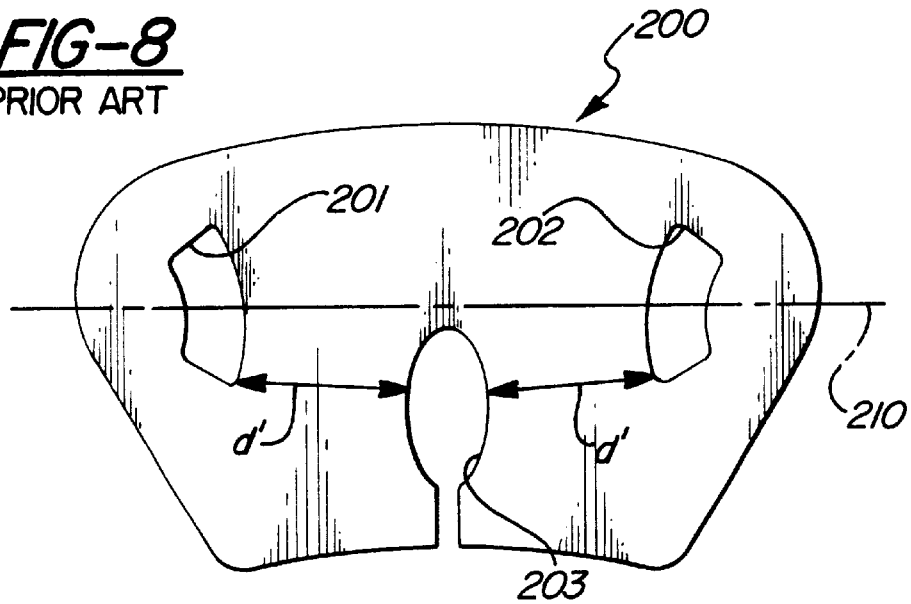
FIG. 8 is an enlarged front view of another conventional guide link of the prior art.

FIG. 6 shows another embodiment of this invention. In this figure, the same reference characters as in the above embodiments indicate the same or corresponding parts. In this example, an arcuate surface with radius R, which equals (r+D), that centers around pinhole center O, is formed around pinhole 41 in each of a left end 5a and at right end 5b of guide link 4. Each of the left and right ends 5a, 5b extend beneath outside edges 4a, 4b to form openings 48, 48'. Each of openings has at least one arcuate surface equally spaced from a corresponding aperature edge. Uniform material thickness D, which equals (R−r), is ensured between the edge of openings 48, 48' and the edge of pinhole 41 in the vicinity of the pinhole. Thereby, the rigidity of the guide link 4 can be reduced and the material thickness between the edge of slits 48, 48' and the edge of pinhole 41 in the vicinity of the pinhole can be made uniform, which prevents decrease of the fitting force between pinhole 41 and connecting pin 3.

In the examples illustrated in FIGS. 4, 5 and 6, an example of the coincidence or agreement of the center of the arc that forms the edges of the window hole and slit in the vicinity of the pinhole, with pinhole center O, was shown, but this invention is not limited to those examples. As long as the material thickness between the edges of the link and the edge of the pinhole is substantially uniform, the center of the arc that forms each link edge can be at the edge of the pinhole or the outside of the pinhole.

As explained above, in the back-driving silent chain of this invention, window holes or slits are formed on both sides of the pinhole center line of the guide link and the edges of the window holes and slits in the vicinity of the pinhole are formed by arcuate surfaces of equal distance from the edge of the pinhole. Thus, the rigidity of the guide link can be reduced. The material thickness between the edges of the window holes and slits and the edge of the pinhole can be made uniform in the vicinity of the pinhole, which avoids a decrease of the fitting force of the connecting pin into the pinhole.

What is claimed is:

1. A back-drive-type silent chain comprising:

a plurality of rows of interleaved links, each of said links having a pair of circular apertures at both ends thereof, said apertures defining a horizontal centerline between their centers, each of said links having a pair of teeth on each of opposite sides of said center line of said apertures, said links being connected with one another by round pins received in said apertures, guide links being placed on the outer edges of alternate rows of said links, each of said guide links having a pair of apertures, said apertures defining a horizontal centerline between their centers, each of said round pins having ends being press-fit into said apertures of said guide links, each of said guide links including a pair of flat outside surfaces and at least one window hole, said pair of flat outside surfaces being formed on the opposite sides of and equally spaced from said horizontal centerline of said guide links apertures, said pair of flat outside surfaces being adapted to contact a surface of a corresponding chain tensioner arm, said window hole having edge portions in the vicinity of said guide link apertures, said window hole edge portions being formed of arcuate surfaces, said arcuate surfaces being equally spaced from an associated aperture.

2. The back-drive-type silent chain of claim 1, wherein said window hole comprises a single opening symmetrical about the center line of said guide link apertures, said window hole being generally I-shaped and having top and bottom and left and right sides, said top and bottom sides being substantially flat, and said window hole left and right sides being arcuate.

3. The back-drive-type of silent chain of claim 2, within each of said arcuate left and right sides of said window hole is equally spaced from a corresponding aperture edge.

4. The back-drive-type silent chain of claim 1, wherein said guide link includes a pair of window holes, each of said window holes being substantially triangular in shape with a pair of arcuate sides.

5. The back-drive-type silent chain of claim 4, wherein each of said arcuate sides of said window holes is equally spaced from a corresponding aperture edge.

6. The back-drive-type silent chain of claim 1, wherein said guide link includes a pair of window holes being substantially triangular in shape with three sides, each of said window holes having an opening formed in one of said sides, two of said window sides having arcuate surfaces.

7. The back-drive-type silent chain of claim 6, wherein each of said triangular window holes having said opening formed in one side being connected to a corresponding outside surface of said guide link.

8. The back-drive-type of silent chain of claim 7, wherein each of said arcuate sides of said window holes is equally spaced from a corresponding aperture edge.

9. The back-drive-type silent chain of claim 1, wherein said guide link has a left end and a right end, each of said left and right ends being arcuate in shape and concentric with a corresponding aperture, each of said left and right ends extending beneath said outside edges to form an opening between each of said apertures and said outside edges, each of said openings having at least one arcuate surface.

10. The back-drive-type of silent chain of claim 9, wherein each of said arcuate sides of said openings is equally spaced from a corresponding aperture edge.

* * * * *

UNITED STATES PATENT AND TRADEMARK OFFICE
CERTIFICATE OF CORRECTION

PATENT NO.   : 6,171,209 B1
DATED        : January 9, 2001
INVENTOR(S)  : Akio Matsuda It is certified that error appears in the above-identified patent and that said Letters Patent is hereby corrected as shown below:

<u>Title page,</u>
Item [75], Inventor, change "Nabari (JP)" to -- Nabari City (JP) --.
Item [74], *Attorney, Agent, or Firm*" change "Sidney & Austin" to -- Sidley & Austin --.

<u>Column 6,</u>
Line 33, delete "of" (first occurrence); change "within" to -- wherein --.
Line 40, delete "of" (first occurrence).
Line 52, delete "of" (first occurrence).
Line 63, delete "of" (first occurrence).

Signed and Sealed this

First Day of October, 2002

*Attest:*

*Attesting Officer*

JAMES E. ROGAN
*Director of the United States Patent and Trademark Office*